J. S. HAMILTON.
FEED AGITATOR FOR FEED TROUGHS.
APPLICATION FILED APR. 29, 1919.
1,311,691.
Patented July 29, 1919.
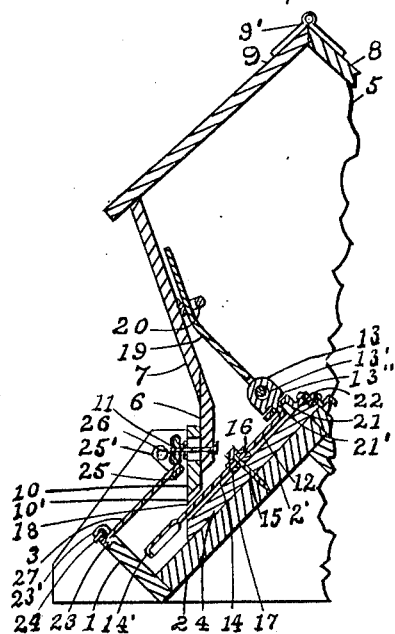
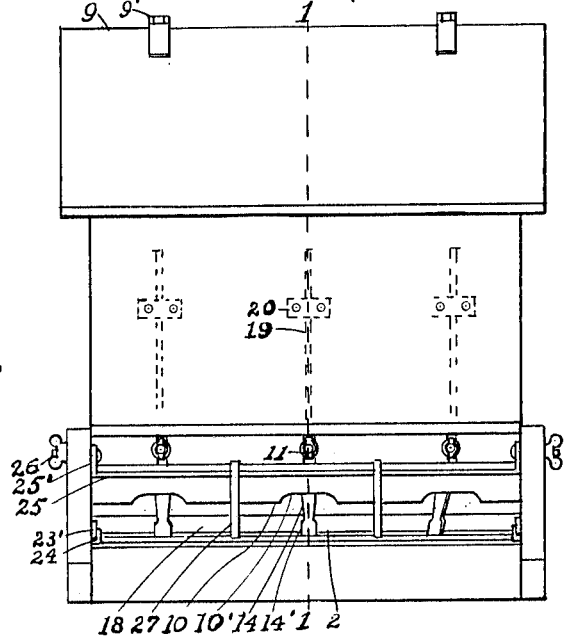
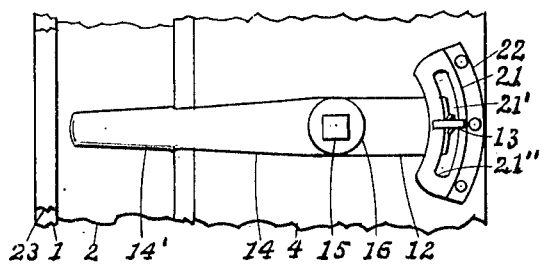
INVENTOR.
Jacob S. Hamilton.
BY George W. Hinton.
ATTORNEY.

UNITED STATES PATENT OFFICE.

JACOB S. HAMILTON, OF HARLAN, IOWA.

FEED-AGITATOR FOR FEED-TROUGHS.

1,311,691.   Specification of Letters Patent.   Patented July 29, 1919.

Application filed April 29, 1919. Serial No. 293,487.

*To all whom it may concern:*

Be it known that I, JACOB S. HAMILTON, a citizen of the United States, residing at Harlan, in the county of Shelby and State of Iowa, have invented certain new and useful Improvements in Feed-Agitators for Feed-Troughs, of which the following is a specification, reference being had therein to the accompanying drawing.

My invention relates to improvements in feed agitators for feed troughs, and the objects of my improvements are, first: to provide a simple, substantial and durable feed agitator, which shall be extremely cheap in cost of manufacture, second; to so construct the parts of the agitator that the greater part of them may be die-stamped from sheet metal, and be ready for use without any further work in forming them, third; to so construct the agitator that the parts shall be reduced to the minimum in number, and by the use of which the feed shall be agitated from its central portion to the inner surface of the front wall of the bin in which the feed is stored and along the inclined surface of the bottom of the bin to its point of discharge from said bin.

I attain these objects by the mechanism illustrated in the accompanying drawings, in which:—

Figure 1 is a transverse section of the trough and feed bin, cut through the center of one of the agitators, on the line 1—1, seen in Fig. 2. Fig. 2 is a front view of the feed bin. Fig. 3 is an enlarged top plan of one of the feed agitators, the agitator rod being omitted.

Referring to Fig. 1, the feed trough is composed of the inclined trough front 1, inclined trough bottom 2, having the extended portion 2' formed therewith and the vertical trough ends 3, substantially secured together, in any suitable manner known to the trough builder's art. In actual practice said trough is built in duplicate, but since both of said troughs are alike in construction and operation, one of said troughs is neither shown nor described.

The feed bin is composed of bin bottom 4, secured on the extension 2', bin ends 5, vertical front 6, inclined front 7, bin top 8 and lid 9, hinged to said top by hinges 9'.

Door 10 is slidably secured on the vertical bin front 6, by the bolts and thumb nuts 11. Said door has the cut-outs 10' formed in its bottom surface for permitting movement of the hereinafter described agitator levers.

It will be seen in Fig. 1, that the agitator body 12 has the feed agitator 13 formed on its inner end and lever 14 formed on its outer extremity. Said body is oscillatably mounted on pivot bolt 15, which passes through upper washer 16, body 12 and lower washer 17, and its lower end portion is driven through a tight fitting aperture formed through bin bottom 4 and into a similarly fitting aperture formed in the adjacent portion of trough extension 2'.

The outer extremity of said lever terminates in a handle 14', which has its edge portions turned downward, forming a comfortable handle for hogs to operate as hereinafter described. Said handle extends from lever 14, almost to trough front 1 and is a slight distance above trough bottom 2, for allowing said handle to pass clear of obstructions, such as moistened feed and the like.

Feed discharge opening 18 is regulated as to height, by adjusting the height of door 10 from bin bottom 4, for regulating the discharge of feed from the previously described bin. Agitator 13 has an eye 13' formed therethrough, in which the lower looped end of the agitator rod 19 is placed and is secured by closing said loop, forming a loose connection for said parts. The loose fitting eye 20 is passed over the upper end portion of said rod and is secured on the inner surface of the inclined front 7. Said upper end portion of said rod is formed at an incline to its lower end portion for somewhat conforming the alinement of said rod with said inner surface of said inclined front.

Scrapers 13" are formed on the lower edge of agitator 13, for removing feed from the upper surface of the body guide 21. Said guide has the floor flange 22 formed therewith, which flange is secured on the upper edge portion of bin bottom 4.

Slot 21' is formed through said guide, the ends 21" of said slot forming stops against which the lower or neck portion of agitator 13 is moved, for limiting movement of said agitator.

Agitator 13 and the body 12 integral therewith are prevented from tilting by the free edge portion of guide 21, which extends over the free end of said body.

It will be seen in Fig. 3, that said agitator is turned ninety degrees from the position it would occupy upon being bent upward at a right angle to said body, and that its neck portion is thereby twisted ninety degrees.

In placing the parts in the position seen, said agitator is turned into alinement with said slot, is passed therethrough and is thereafter turned from the described position to the position shown, after which guide flange 22 is secured in the position seen in Figs. 1 and 3, after which the other parts are placed in their respective positions, and secured as described.

On the upper edge of trough front 1, (see Figs. 1 and 2,) rests the front fender bar 23, the two ends of which are bent L shaped as seen at 23'. Each of said L shaped ends is pivotally connected to one of the trough ends 3, by a staple 24. One side of each staple is passed through an aperture formed through its respective end of said bar and said staple is then secured in its respective trough end.

Rear fender bar 25 is similarly formed and has its L shaped ends 25' detachably secured to said trough ends by thumb screws 26, which pass through apertures in the last mentioned bar ends and trough ends 3, and are secured therein by thumb nuts 26', seen in Fig. 2.

Fenders 27 are flat straps of metal extended transversely over said trough, at suitable distances from each other, to prevent animals from getting into said trough with their feet, and to act as separating bars for separating said trough into compartments, in the center of each of which the handle 14' of an agitator is placed. The front ends of said fenders are substantially secured on front fender bar 23, while their rear ends are similarly secured on rear fender bar 25, which latter is close to door 10.

In operation, the lower edge of lid 9 is raised and granular feed, such as shelled corn, wheat, dry ground feed, or the like is poured into the described bin, onto bottom 4 and the inclosed parts of the agitator. The feed discharge opening 18 is adjusted by raising or lowering door 10, and securing it in place by thumb nuts 11, at such height above bin bottom 4, as will allow said feed to gravitate thereunder, when the latter is agitated. Animals, not shown, feed from the described trough, and in so doing insert their noses between fenders 27, into the described trough, above trough front 1. In moving their noses about, to get feed, their noses strike the handles 14', thereby oscillating said handles and their connected parts, including agitator 13 and rod 19.

The last mentioned parts agitate the feed in said bin, upon which some of said feed gravitates through the discharge opening 18 into the described trough. When it is desired to stop said gravitation of feed, thumb nuts 11 are loosened, upon which door 10 gravitates onto the front edge portion of bin bottom 4, thereby practically closing said discharge opening.

When it is desired to clean said trough, thumb nuts 26' and thumb screws 26 are removed from trough ends 3 and from the ends 22' of rear fender bar 25. Said bar is thereafter lifted which, by the fenders 27, rotates the front fender bar 23 and the bar ends 23' integral therewith, on staples 24, thereby removing said fenders from over said trough; after which the latter is cleaned in any well known manner.

The thus removed parts are returned from their described position to the position shown, after which the trough is again ready for use.

It will readily be understood, that when agitator rod 19 is agitated, as previously described, that it agitates the grain against the same and adjacent thereto, which agitation loosens the grain from the upper portion of the inclined front 7, to which in actual practice said grain sometimes adheres. Said rod also assists in agitating the grain which is more nearly in the central portion of said bin; which together with the agitator 13, provides ample agitating means for agitating the grain above the level of the agitator body 1; which latter agitates the grain which rests upon bin bottom 4.

Such grain as gravitates onto guide 21 is scraped therefrom by the oscillating moved scrapers 13''.

While I have shown the parts of the agitating devices of certain forms and proportions, it is evident that said forms and proportions could be varied, without departing from the spirit of my invention, which I reserve the right to do.

Having fully described my invention, what I claim as new, and desire to secure by Letters Patent, is:—

1. The combination with a feed trough having an inclined bottom and with a feed bin having an inclined bottom leading into said trough; of a feed agitator comprising an agitator body and lever having a handle formed with said lever, said handle extending over and near the bottom of said trough; mounting means whereby said agitator body is oscillatably mounted on the bottom of said bin; anti-tilting means secured on the bottom of said bin and extending over the free end of said agitator body; said anti-tilting means having a slot formed therethrough; and a feed agitator formed with said body, said agitator being extended from said body at practically a right angle thereto and through said slot, said agitator having an eye formed through its upper portion; an agitator rod having its lower end loosely connected through said eye with said agitator, said rod being bent to conform with the alinement of the adjacent front wall of said bin; and a loose fitting eye secured on said wall in which eye the intermediate portion of said rod is slidably and oscillatably mounted.

2. In a feed agitator; mounting means whereby the body of said agitator is oscillatably mounted on the inclined bottom of a feed bin; anti-tilting means secured on the bottom of said feed bin whereby said agitator body is held against tilting both laterally and longitudinally, said anti-tilting means having a slot of segmental form formed therethrough; a feed agitator formed with said agitator body said agitator being extended upward through said slot; a feed agitating lever formed with said agitator body; and a handle formed on the free end of said lever, said handle extending beyond the confines of said feed bin.

In testimony whereof I affix my signature.

JACOB S. HAMILTON.

Copies of this patent may be obtained for five cents each, by addressing the "Commissioner of Patents, Washington, D. C."